(12) United States Patent
Hwang (10) Patent No.: US 11,842,211 B2
(45) Date of Patent: Dec. 12, 2023

(54) METHOD AND SYSTEM FOR COLLECTING USER INFORMATION ACCORDING TO USAGE OF PROVIDED VIRTUAL DESKTOP INFRASTRUCTURE SERVICE

(71) Applicant: Piamond Corp., Busan (KR)

(72) Inventor: Doo Geon Hwang, Busan (KR)

(73) Assignee: PIAMOND CORP., Busan (KR)

( * ) Notice: Subject to any disclaimer, the term of this patent is extended or adjusted under 35 U.S.C. 154(b) by 0 days.

(21) Appl. No.: 17/838,617

(22) Filed: Jun. 13, 2022

(65) Prior Publication Data

US 2022/0358164 A1    Nov. 10, 2022

Related U.S. Application Data

(63) Continuation of application No. 17/229,433, filed on Apr. 13, 2021, now Pat. No. 11,385,924.

(30) Foreign Application Priority Data

Jan. 22, 2021   (KR) .................. 10-2021-0009347

(51) Int. Cl.
*G06F 9/455* (2018.01)
*G06F 9/451* (2018.01)
(Continued)

(52) U.S. Cl.
CPC ........ *G06F 9/45558* (2013.01); *G06F 3/0649* (2013.01); *G06F 9/4451* (2013.01);
(Continued)

(58) Field of Classification Search
None
See application file for complete search history.

(56) References Cited

U.S. PATENT DOCUMENTS 9,374,360 B2 * 6/2016 Kim .................. H04L 63/0815
9,870,238 B2   1/2018 Astete
(Continued)

FOREIGN PATENT DOCUMENTS

KR    10-2175317    11/2020

OTHER PUBLICATIONS

R. Bruschi et al., "An SDN/NFV Platform for Personal Cloud Services," in IEEE Transactions on Network and Service Management, vol. 14, No. 4, pp. 1143-1156, Dec. 2017, doi: 10.1109/TNSM.2017.2761860. (Year: 2017).*

(Continued)

*Primary Examiner* — Abu Zar Ghaffari
(74) *Attorney, Agent, or Firm* — NIXON PEABODY LLP (57) ABSTRACT

A user information collection system may include a service provisioning manager configured to manage provisioning of a VDI service provided from a VDI service provider; a charging manager configured to manage charging information according to a use of the VDI service by a user; a policy manager configured to manage a policy for the VDI service; a user manager configured to manage information of the user using the VDI service; a VDI service lifecycle manager configured to manage a lifecycle of the VDI service provided from the VDI service provider; and a multi-tenant connection manager configured to manage connection infrastructure information between at least one of a cloud environment for providing the VDI service and external software as a service (SaaS) and the VDI service provider.

7 Claims, 10 Drawing Sheets

(51) Int. Cl.

| | |
|---|---|
| *G06F 9/48* | (2006.01) |
| *G06F 9/50* | (2006.01) |
| *H04L 9/06* | (2006.01) |
| *G06F 9/445* | (2018.01) |
| *G06F 3/06* | (2006.01) |
| *G06Q 30/04* | (2012.01) |
| *G06Q 20/08* | (2012.01) |
| *H04L 41/5019* | (2022.01) |
| *H04L 9/00* | (2022.01) |

(52) U.S. Cl.
CPC .............. *G06F 9/452* (2018.02); *G06F 9/485* (2013.01); *G06F 9/5027* (2013.01); *G06F 9/5072* (2013.01); *G06Q 20/085* (2013.01); *G06Q 30/04* (2013.01); *H04L 9/0643* (2013.01); *H04L 41/5019* (2013.01); *G06F 2009/4557* (2013.01); *G06F 2009/45562* (2013.01); *G06F 2009/45591* (2013.01); *H04L 9/50* (2022.05)

(56) References Cited

U.S. PATENT DOCUMENTS

| | | | |
|---|---|---|---|
| 10,997,561 B2 | 5/2021 | Isaac | |
| 11,068,162 B1 | 7/2021 | Meister | |
| 2007/0067297 A1 | 3/2007 | Kublickis | |
| 2011/0185355 A1* | 7/2011 | Chawla | G06F 9/45558 718/1 |
| 2011/0296000 A1* | 12/2011 | Ferris | G06Q 10/00 718/1 |
| 2012/0191518 A1 | 7/2012 | Nix | |
| 2013/0144744 A1 | 6/2013 | Astete | |
| 2013/0332610 A1* | 12/2013 | Beveridge | G06F 9/45558 709/226 |
| 2014/0074973 A1 | 3/2014 | Kumar | |
| 2014/0075412 A1 | 3/2014 | Kannan | |
| 2014/0250439 A1* | 9/2014 | Parashar | G06F 9/5083 718/104 |
| 2014/0358699 A1* | 12/2014 | Buck | G06Q 30/0277 705/14.73 |
| 2014/0372286 A1 | 12/2014 | Neal | |
| 2015/0007180 A1 | 1/2015 | Sharp | |
| 2015/0150143 A1 | 5/2015 | Im | |
| 2015/0358392 A1 | 12/2015 | Ramalingam | |
| 2016/0139949 A1 | 5/2016 | Jagannath | |
| 2017/0139738 A1* | 5/2017 | Kim | G06F 9/452 |
| 2018/0336055 A1* | 11/2018 | Bernardini | G06F 9/45558 |
| 2018/0365686 A1 | 12/2018 | Kondo | |
| 2020/0117791 A1 | 4/2020 | Bingham | |
| 2020/0186445 A1* | 6/2020 | Govindaraju | H04L 67/34 |
| 2020/0233682 A1 | 7/2020 | Forder | |
| 2020/0382651 A1* | 12/2020 | Neal | H04M 15/09 |
| 2021/0279780 A1 | 9/2021 | Herken | |

OTHER PUBLICATIONS

Wei et al., "A VDI system based on CloudStack and Active Directory," 14$^{th}$ International Symposium on Distributed Computing and Applications for Business Engineering and Science, IEEE, pp. 151-154, 2015.

* cited by examiner

METHOD AND SYSTEM FOR COLLECTING USER INFORMATION ACCORDING TO USAGE OF PROVIDED VIRTUAL DESKTOP INFRASTRUCTURE SERVICE

CROSS-REFERENCE TO RELATED APPLICATION

This application is a continuation of U.S. patent application Ser. No. 17/229,433 filed on Apr. 13, 2021, which has been allowed; U.S. patent application Ser. No. 17/229,433 claims the priority benefit of Korean Patent Application No. 10-2021-0009347, filed on Jan. 22, 2021, in the Korean Intellectual Property Office, the disclosures of which are incorporated herein by reference.

BACKGROUND

1. Field of the Invention

Example embodiments of the following description relate to a method and system for collecting user information according to providing a virtual desktop infrastructure (VDI) service.

2. Description of the Related Art

A virtual desktop infrastructure (VDI) or a desktop virtualization refers to a solution that provides a virtual desktop and a data storage space for each user using resources of a server that operates in a center through virtualization and also refers to technology for generating another computer that operates in a physically absent, but actually operating computer.

With activation of such VDI, an environment of using general personal services is expected to evolve to a thin terminal and/or zero terminal environment.

Meanwhile, online service providers or advertising providers desire to own personal information to increase their sales. However, there is an issue of, such as, for example, improving recognition of personal information and cost payment for use and accordingly, collecting and using personal information of a user is becoming more difficult due to blocking of third party cookies.

SUMMARY

Example embodiments provide a method and system for collecting user information that allows online service providers and/or advertising providers to provide a virtual desktop infrastructure (VDI)-based computing service and an additional service to users and to collect user information generated through the provided VDI-based computing service and additional service.

According to an aspect of at least one example embodiment, there is provided a user information collection system implemented by at least one computer apparatus, the user information collection system including a service provisioning manager configured to manage provisioning of a virtual desktop infrastructure (VDI) service provided from a VDI service provider; a charging manager configured to manage charging information according to a use of the VDI service by a user; a policy manager configured to manage a policy for the VDI service; a user manager configured to manage information of the user using the VDI service; a VDI service lifecycle manager configured to manage a lifecycle of the VDI service provided from the VDI service provider; and a multi-tenant connection manager configured to manage connection infrastructure information between at least one of a cloud environment for providing the VDI service and external software as a service (SaaS) and the VDI service provider.

The user manager may be configured to provide a user interface for receiving a consent on providing data collected according to the use of the VDI service by the user to the VDI service provider, collect the data according to the use of the VDI service by the user, and transfer the collected data to the VDI service provider that provides the VDI service.

A record related to transferring the collected data to the VDI service provider may be stored in a blockchain or an unmodifiable ledger.

The user information collection system may further include a VDI service monitor configured to monitor the VDI service and to determine whether service level agreement (SLA) requirements of an individual user level are met.

The VDI service monitor may be configured to determine whether a provision state of the VDI service is appropriate from perspective of the VDI service provider.

The user information collection system may further include a VDI service lifecycle manager configured to manage the lifecycle of the VDI service provided from the VDI service provider.

The VDI service provider may include a physical computer apparatus of a provider that desires to collect user data through providing of the VDI service. A computer program provided from the VDI service provider or an external provider may be installed and executed on the user information collection system, and an external module of the VDI service provider or an external module of the external provider may be configured to receive data of the user collected by the user information collection system through the computer program that is installed and executed on the user information collection system.

The computer program provided from the external provider may include an advertising (ad) agent or a federated learning agent.

According to an aspect of at least one example embodiment, there is provided a user information collection method of a computer apparatus including at least one processor, the user information collection method including, by the at least one processor, receiving a VDI service request from a user; verifying VDI service contract details of a VDI service provider to which the user belongs; verifying a capability of the VDI service based on a level of the user; collecting data according to a use of a VDI service by the user; and transferring the collected data.

A computer program provided from the VDI service provider or an external provider may be installed and executed on the computer apparatus, and the transferring of the collected data may include transmitting the collected data to an external module of the VDI service provider or an external module of the external provider through the computer program that is installed and executed on the user information collection system.

Cost according to the use of the VDI service by the user may be charged to the VDI service provider that provides the VDI service, or may be co-shared with a provider of a specific website visited by the user or a provider of a software service used by the user.

A differential VDI service may be provided based on the level of the user and the capability of the VDI service.

According to an aspect of at least one example embodiment, there is provided a non-transitory computer-readable record medium storing instructions that, when executed by a processor, cause the processor to perform the user information collection method.

According to some example embodiments, online service providers and/or advertising providers may provide a virtual desktop infrastructure (VDI)-based computing service and an additional service to users and may collect user information generated through the provided VDI-based computing service and additional service.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Hereinafter, some example embodiments will be described in detail with reference to the accompanying drawings. The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

The terminology used herein is for describing various example embodiments only, and is not to be used to limit the disclosure. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component, without departing from the scope of the disclosure.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Hereinafter, example embodiments are described with reference to the accompanying drawings.

A user information collection system according to the example embodiments may be implemented by at least one computer apparatus. Here, a computer program according to an example embodiment may be installed and executed on the computer apparatus and the computer apparatus may perform a user information collection method according to the example embodiments under control of the executed computer program. The aforementioned computer program may be stored in a computer-readable record medium to computer-implement the user information collection method according to the example embodiments in conjunction with the computer apparatus.

Figure 1:
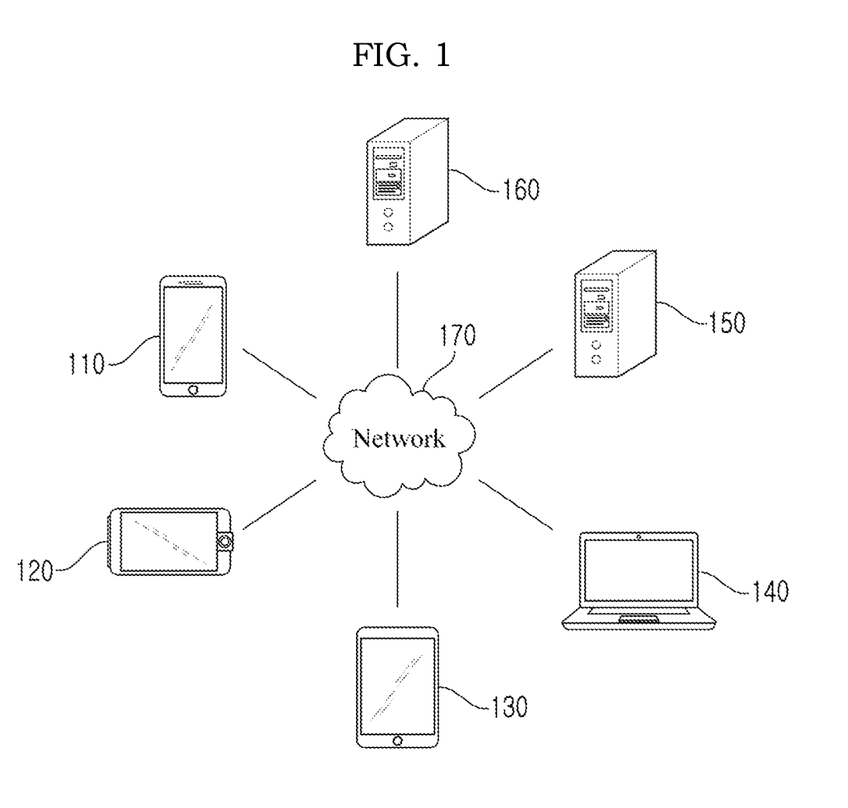
FIG. 1 illustrates an example of a network environment according to an example embodiment.

FIG. 1 illustrates an example of a network environment according to an example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto. Also, the network environment of FIG. 1 is provided as an example among environments applicable to the example embodiments and an environment applicable to the example embodiments is not limited to the network environment of FIG. 1.

Each of the plurality of electronic devices 110, 120, 130, and 140 may be a fixed terminal or a mobile terminal that is configured as a computer apparatus. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, and the like. For example, although FIG. 1 illustrates a shape of a smartphone as an example of the electronic device 110, the electronic device 110 used herein may refer to one of various types of physical computer apparatuses capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, and a satellite network) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and 140 over the network 170. For example, the server 150 may be a system that provides a service to the plurality of electronic devices 110, 120, 130, and 140 connected over the network 170. For example, the service may include a cryptocurrency service, a virtual exchange service, a social network service, a payment service, a risk monitoring service, an instant messaging service, a game service, a group call service or an audio conferencing service, a messaging service, a mail service, a map service, a translation service, a financial service, a search service, and a content providing service.

Figure 2:
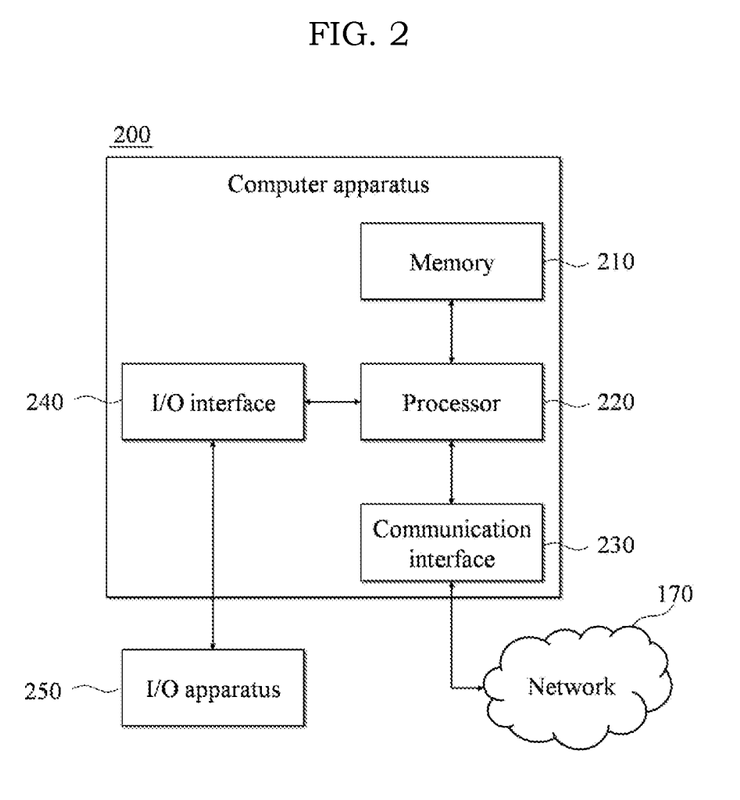
FIG. 2 is a block diagram illustrating an example of a computer apparatus according to an example embodiment.

FIG. 2 is a block diagram illustrating an example of a computer apparatus according to an example embodiment. Each of the plurality of electronic devices 110, 120, 130, and 140 or each of the servers 150 and 160 may be implemented by the computer apparatus 200 of FIG. 2.

Referring to FIG. 2, the computer apparatus 200 may include a memory 210, a processor 220, a communication interface 230, and an input/output (I/O) interface 240. The memory 210 may include a permanent mass storage device, such as random access memory (RAM), a read only memory (ROM), and a disk drive, as a non-transitory computer-readable record medium. The permanent mass storage device, such as ROM and disk drive, may be included in the computer apparatus 200 as a permanent storage device separate from the memory 210. Also, an OS and at least one program code may be stored in the memory 210. Such software components may be loaded from another non-transitory computer-readable record medium separate from the memory 210. The other non-transitory computer-readable record medium may include a non-transitory computer-readable record medium, for example, a floppy drive, a disk, a tape, a DVD/CD-ROM drive, a memory card, etc. According to other example embodiments, software components may be loaded to the memory 210 through the communication interface 230, instead of the non-transitory computer-readable record medium. For example, the software components may be loaded to the memory 210 of the computer apparatus 200 based on a computer program installed by files provided over the network 170.

The processor 220 may be configured to process instructions of a computer program by performing basic arithmetic operations, logic operations, and I/O operations. The computer-readable instructions may be provided from the memory 210 or the communication interface 230 to the processor 220. For example, the processor 220 may be configured to execute received instructions in response to the program code stored in the storage device, such as the memory 210.

The communication interface 230 may provide a function for communication between the computer apparatus 200 and another apparatus, for example, the aforementioned storage devices through the network 170. For example, the processor 220 of the computer apparatus 200 may transfer a request or an instruction created based on a program code stored in the storage device such as the memory 210, data, a file, etc., to other devices over the network 170 under control of the communication interface 230. Inversely, a signal, an instruction, data, a file, etc., from another apparatus may be received at the computer apparatus 200 through the communication interface 230 of the computer apparatus 200 by going through the network 170. For example, a signal, an instruction, content, data, etc., received through the communication interface 230 may be transferred to the processor 220 or the memory 210, and a file, etc., may be stored in a storage medium, for example, the permanent storage device, further includable in the computer apparatus 200.

The I/O interface 240 may be a device used for interface with an I/O apparatus 250. For example, an input device may include a device, such as a microphone, a keyboard, a mouse, etc., and an output device may include a device, such as a display, a speaker, etc. As another example, the I/O interface 240 may be a device for interface with an apparatus in which an input function and an output function are integrated into a single function, such as a touchscreen. At least one component of the I/O apparatus 215 may be configured as a single device with the computer apparatus 200. For example, a touchscreen, a microphone, a speaker, etc., may be implemented to be included in the computer apparatus 200, such as a smartphone.

According to other example embodiments, the computer apparatus 200 may include a number of components greater than or less than a number of components shown in FIG. 2. However, there is no need to clearly illustrate many components according to the related art. For example, the computer apparatus 200 may include at least a portion of the I/O apparatus 250, or may further include other components, for example, a transceiver, a database (DB), and the like.

Figure 3:
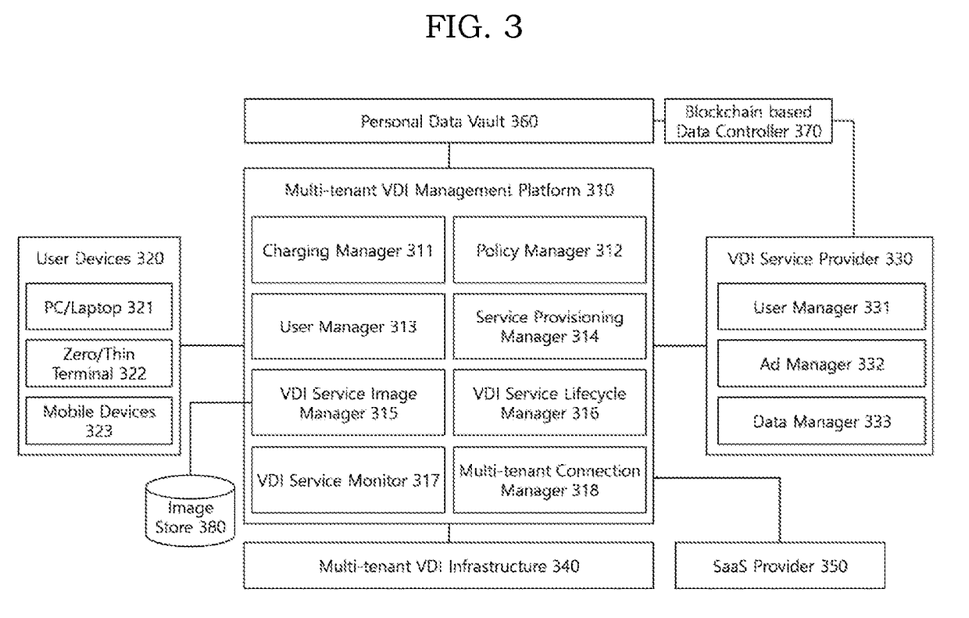
FIG. 3 is a diagram illustrating an example of a user information collection system according to an example embodiment.

FIG. 3 is a diagram illustrating an example of a user information collection system according to an example embodiment. FIG. 3 illustrates a multi-tenant VDI management platform 310, user devices 320, a VDI service provider 330, a multi-tenant VDI infrastructure 340, a software as a service (SaaS) provider 350, a personal data vault 360, and a blockchain based data controller 370. The user information collection system may include at least the multi-tenant VDI management platform 310.

The user devices 320 may include a personal computer (PC)/laptop 321, a zero/thin terminal 322, and mobile devices 323.

The PC/laptop 321 refers to a terminal of a user that connects to a VDI service in a general PC or laptop environment and may be used in response to a request for a computing capability of using an additional service or a specific service.

The zero/thin terminal 322 may provide a terminal environment with a limited function for using a VDI service.

The mobile device 323 refers to a terminal of a user that connects to the VDI service in a mobile environment.

The VDI service provider 330 refers to a system of a provider that desires to collect user data by providing the VDI service and may include an online provider, an existing advertising provider, a terminal (client) provider, and the like. That is, the VDI service provider 330 may be a physical computer apparatus of a provider that desires to collect data of a user, such as, for example, personal information, in exchange for providing a computing environment to the user in a user waiting space.

Here, referring to FIG. 3, the VDI service provider 330 may include a user manager 331, an ad manager 332, and a data manager 333.

The user manager 331 may manage a user of the VDI service. For example, the user manager 331 may process user-related management, such as a level of the user, a charge for use, and a use time.

The ad manager 332 may manage ad related information about the user of the VDI service. To this end, the ad manager 332 may be linked with an external advertising network.

The data manager 333 may manage a use record and sharing data of the user collected through the VDI service. Data managed by the data manager 333 may be used in various forms, such as, for example, personalized advertising and personalization of users using the VDI service. Here, the data may be used within the scope of a contract with the user.

Referring to FIG. 3, the multi-tenant VDI management platform 310 may include a charging manager 311, a policy manager 312, a user manager 313, a service provisioning manager 314, a VDI service image manager 315, a VDI service lifecycle manager 316, a VDI service monitor 317, and a multi-tenant connection manager 318. Here, each of components (311 to 318) may be a functional expression of a function performed by the processor 220 included in the computer apparatus 200 that implements the multi-tenant VDI management platform 310.

The charging manager 311 may manage charging information according to the use of the VDI service. For example, the charging manager 311 may charge the VDI service provider 330 based on an amount of time used by the user. As another example, the charging manager 311 may allow a provider of a specific website visited by the user or a provider of a software service used by the user to share expenses. Also, the charging manager 311 may provide a function of processing cost for linking with an external service, such as SaaS, and may provide a function of processing a separate use of an individual user, such as, for example, purchase of a separate product and/or service, in the VDI service.

The policy manager 312 may manage a policy for the VDI service. For example, the policy manager 312 may manage VDI policy related information about use of the VDI service and collecting of user data.

The user manager 313 may manage information of the user that uses the VDI service. For example, the user manager 313 may manage information of the user based on the policy managed by the policy manager 312.

The service provisioning manager 314 may manage provisioning of the VDI service provided from the VDI service provider 330 and may meet service level agreement (SLA) requirements through management of provisioning.

The VDI service image manager 315 may manage an image of environment information for the VDI service. An external storage, for example, an image store 380, may be used and an image may be provided from the VDI service provider 330.

The VDI service lifecycle manager 316 may manage the overall lifecycle of the VDI service provided from the VDI service provider 330. For example, the VDI service lifecycle manager 316 may set a lifecycle for each VDI service and may manage whether the set lifecycle is elapsed.

The VDI service monitor 317 may monitor the VDI service. For example, the VDI service monitor 317 may determine whether SLA requirements at an individual user level are met and may also determine the appropriateness of a providing state of the VDI service on a side of the VDI service provider 330. For example, when the user uses a web service or an application using the VDI service, the VDI service monitor 317 may evaluate the providing state as an SLA factor based on a response speed (a reaction speed), an available capacity, and a user connection state (VDI connectivity). Meanwhile, the VDI service provider 330 aims to provide the VDI service to users and acquire user information according to a user using the provided VDI service. However, if the user performs an office work other than a browsing operation, a utilization value of corresponding information may be low. Therefore, if the appropriateness of the providing state of the VDI service is determined from perspective of the VDI service provider 330 and an appropriate VDI service is provided, it is possible to increase a utilization value of user information acquired through the VDI service.

The multi-tenant connection manager 318 may manage connection infrastructure information between at least one of a cloud (e.g., the multi-tenant VDI infrastructure 340) and an external SaaS (e.g., the SaaS provider 350) and the VDI service provider 330.

The multi-tenant VDI infrastructure 340 may be a cloud environment in which the VDI service operates. The cloud environment may be selected by a provider of the multi-tenant VDI management platform 310 and/or the VDI service provider 330.

The SaaS provider 350 may be a system of an external company that provides a specific service in a VDI environment. The VDI service provider 330 may maximize a user lock-in and a service use time by providing a specific SaaS function through the SaaS provider 350. A service may be provided in response to a contract with the VDI service provider 330 or a request from the user and a separate charging model may be provided.

The personal data vault 360 may provide a function for managing personal information collected when the user uses the VDI service. Whether to use the personal data vault 360 may be determined based on a contract between the VDI service provider 330 and the user. The personal data vault 360 may be present inside or outside the multi-tenant VDI management platform 310 and may store data using a separate encryption scheme.

The blockchain based data controller 370 may provide a function of explicitly storing a transfer record of related data when providing user information collected through the use of the VDI service to the VDI service provider 330 that processes cost according to the use of the VDI service by the user. Here, a blockchain may be used to prevent forgery and alteration of records.

Figure 4:
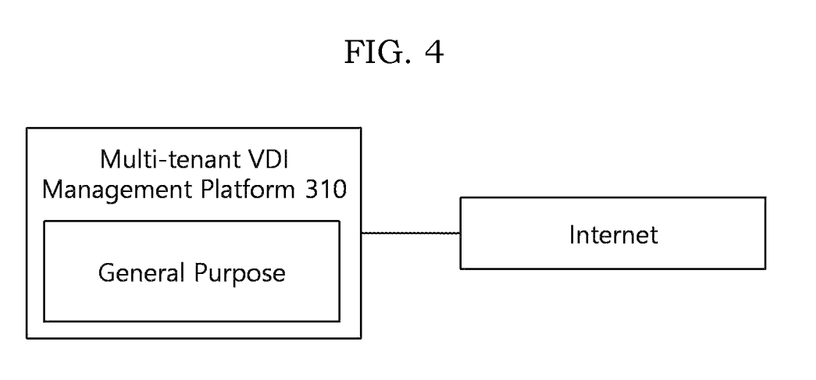
FIGS. 4 to 6 illustrate examples of using a virtual desktop infrastructure (VDI) service according to an example embodiment.
Figure 5:
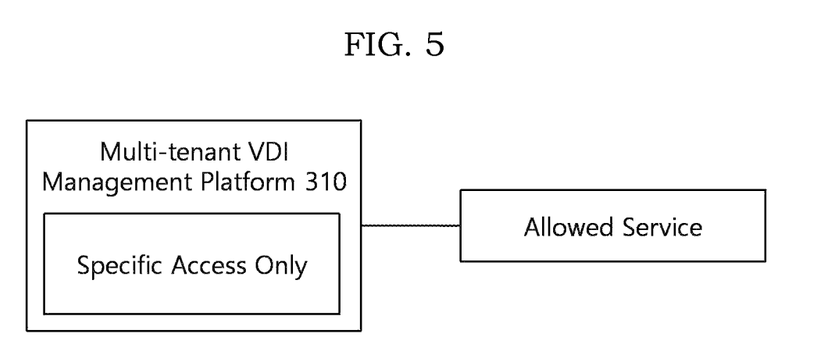
Figure 6:
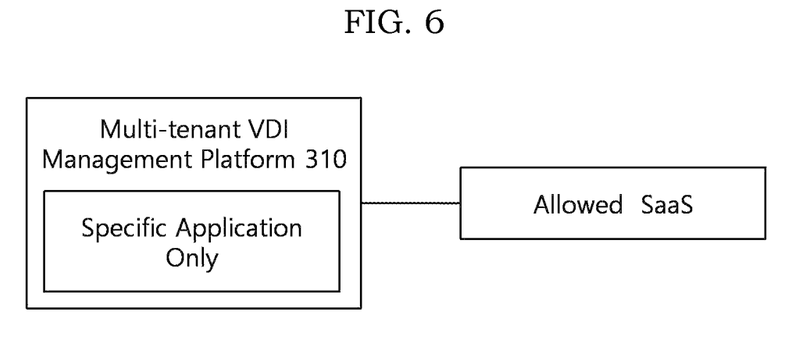

FIGS. 4 to 6 illustrate examples of using a VDI service according to an example embodiment.

FIG. 4 illustrates an example in which the multi-tenant VDI management platform 310 may provide a service using the Internet as a general-purpose service. When accessing a third-party service, a user may verify whether it is possible to access a corresponding VDI service with the multi-tenant VDI management platform 310 and/or the VDI service provider 330 and then may need to acquire an access right. The multi-tenant VDI management platform 310 may pre-define the access right and then template the predefined access right, and may use the templated access right through connection to a user account or an attribute of a group to which the user belongs. Here, the multi-tenant VDI management platform 310 may provide computing to reward the user.

FIG. 5 illustrates an example in which the multi-tenant VDI management platform 310 may provide a function capable of accessing only a specific service allowed by the VDI service provider 330. For example, the VDI service provider 330 may restrict the user to use only a specific service, for example, a shopping site, a social service and/or a virtual reality (VR) based metaverse service, through the multi-tenant VDI management platform 310. That is, the multi-tenant VDI management platform 310 may provide a limited service for the purpose of inducing traffic to a specific service and collecting user data related to the specific service.

FIG. 6 illustrates an example in which the multi-tenant VDI management platform 310 may provide a service of a contracted SaaS company. For example, the multi-tenant VDI management platform 310 may provide a limited service such that Microsoft's MS Office 365-based service, Hancom' cloud-based service, or an Adobe cloud-based service may be used. For example, the SaaS provider 350 may provide the corresponding VDI service to its service subscribers as the VDI service provider 330. To this end, the multi-tenant VDI management platform 310 may restrict providing of the VDI service such that a service of the SaaS provider 350 may be provider to users that are subscribers of the service provided from the SaaS provider 350 among users of the VDI service.

Figure 7:
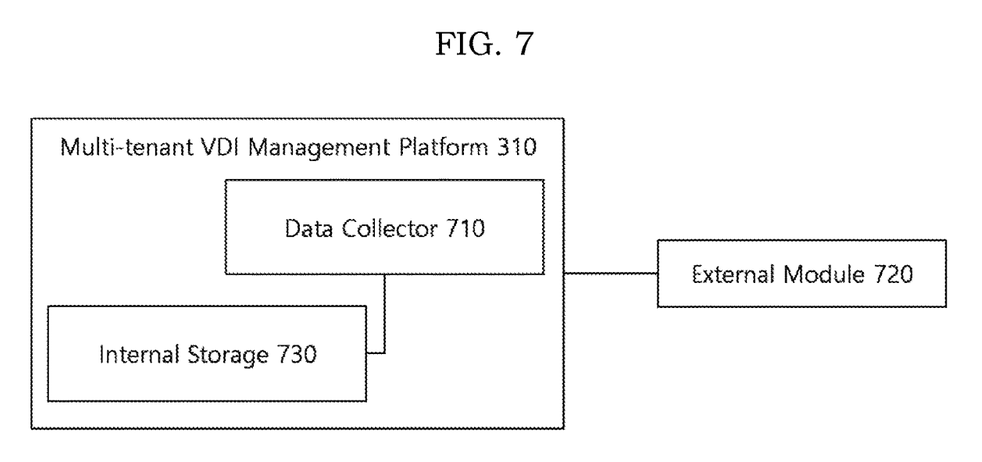
FIGS. 7 to 9 illustrate examples of a structure for collecting use information of a user in a VDI according to an example embodiment.
Figure 8:
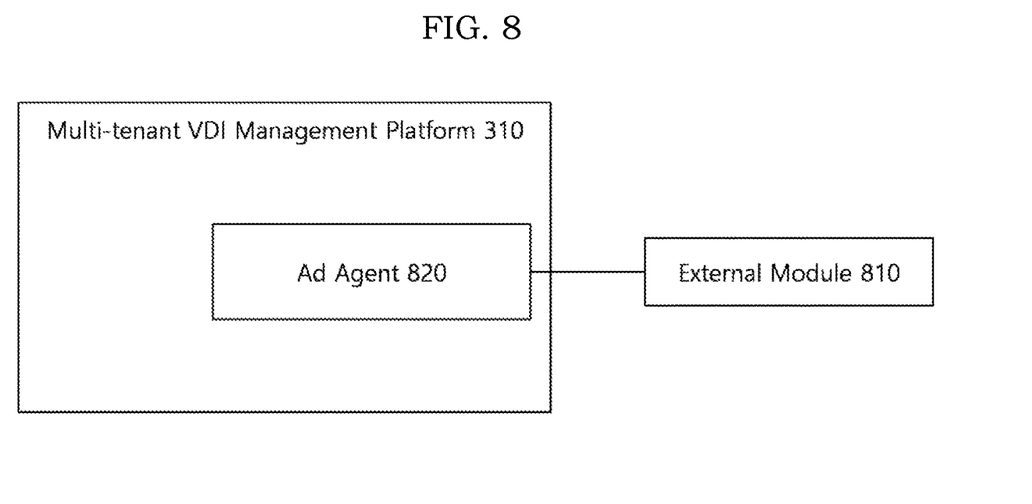
Figure 9:
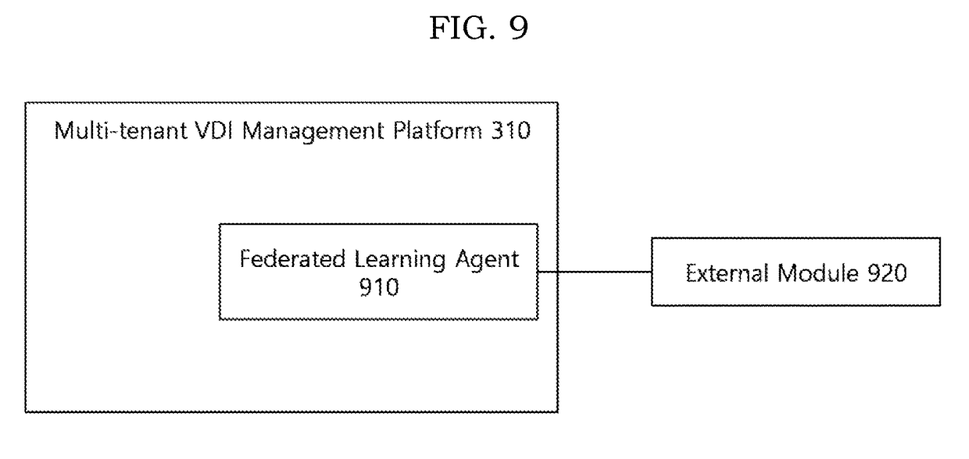

FIGS. 7 to 9 illustrate examples of a structure for collecting use information of a user in a VDI according to an example embodiment.

FIG. 7 illustrates an example in which the multi-tenant VDI management platform 310 includes a data collector 710 provided from the VDI service provider 330 and an external module 720 configured to receive data according to a service use by the user through the data collector 710. To this end, a mutual contract between the VDI service provider 330 and an external provider that provides the external module 720 is required. In the case of using a service, consent to provide data to the external module 720 may be acquired from the user and then data may be extracted and provided. Depending on example embodiments, data may be stored in an internal storage 730 or data stored in the internal storage 730 may be exported.

FIG. 8 illustrates an example in which an ad agent 820 is installed in the multi-tenant VDI management platform 310 and an external module 810 may acquire data through the ad agent 820. Through a contract between a provider of the multi-tenant VDI management platform 310 and an external provider, the external provider may directly install the ad agent 820 in the multi-tenant VDI management platform 310. The external module 810 may collect data related to a service use by a user through the ad agent 820. In this case, the external provider may proceed with a contract management and the like according to data acquisition with the user.

FIG. 9 illustrates an example in which a federated learning agent 910 that is a limited agent type is installed in the multi-tenant VDI management platform 310. For example, the external provider may install the federated learning agent 910 in the multi-tenant VDI management platform 310 through a contract with the provider of the multi-tenant VDI management platform 310 and may collect model-based data through the federated learning agent 910 in an external module 920. Using this, data leakage of the user may be minimized.

Figure 10:
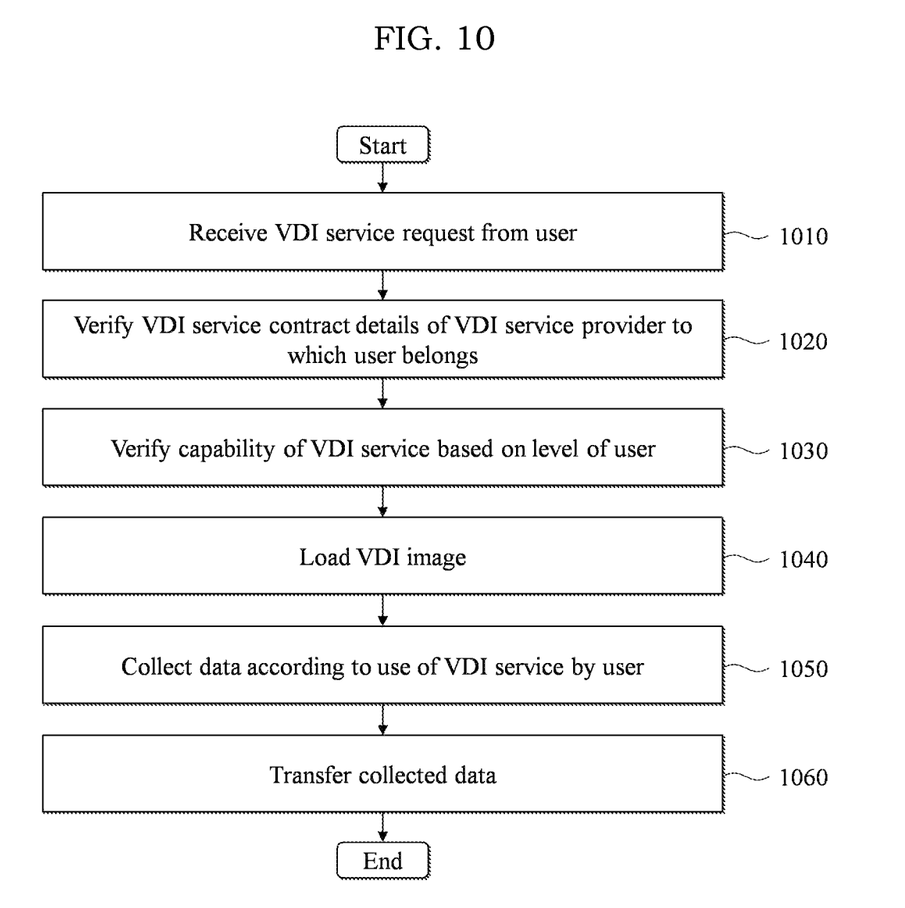
FIG. 10 is a flowchart illustrating an example of a user information collection method according to an example embodiment.

FIG. 10 is a flowchart illustrating an example of a user information collection method according to an example embodiment. The user information collection method according to the example embodiment may be performed by the computer apparatus 200 that implements the multi-tenant VDI management platform 310. Here, the processor 220 of the computer apparatus 200 may be configured to execute a control instruction according to a code of at least one computer program or a code of an OS included in the memory 210. Here, the processor 220 may control the computer apparatus 200 to perform operations 1010 to 1060 included in the user information collection method of FIG. 10 in response to a control instruction provided from a code stored in the computer apparatus 200.

Referring to FIG. 10, in operation 1010, the computer apparatus may receive a VDI service request from a user. For example, the computer apparatus 200 as the multi-tenant VDI management platform 310 may receive the VDI service request from the user device 320. Also, the computer apparatus 200 may receive the VDI service request from a computing resource close to a user environment, such as an edge cloud.

In operation 1020, the computer apparatus 200 may verify VDI service contract details of a VDI service provider to which the user belongs. For example, after completing authentication of the user that requests a VDI service, the computer apparatus 200 may verify whether to make a contract with the VDI service provider that may provide cost for an account of the user. Here, the VDI service provider may correspond to the VDI service provider 330 of FIG. 3.

In operation 1030, the computer apparatus 200 may verify a capability of the VDI service based on a level of the user. For example, the computer apparatus 200 may verify a VDI capability providable from the VDI service provider that may pay cost of the user. Through this, the computer apparatus 200 may differentiate the VDI service based on a characteristic of the service and the level of the user. That is, the differentiated VDI service may be provided based on the level of the user and the capability of the VDI service.

In operation 1040, the computer apparatus 200 may load a VDI image. Here, the VDI image may be an image for providing the VDI service requested by the user.

In operation 1050, the computer apparatus 200 may collect data according to the use of the VDI service by the user. The user may go through a consent procedure of providing user information to the VDI service provider at a time of using the VDI service. That is, the computer apparatus 200 may receive the content of the user to providing user information to the VDI service provider before providing the VDI service to the user. For example, the computer apparatus 200 may inform the VDI service provider that the user information is provided in response to the use of the VDI service and may provide the user with a user interface for receiving the consent to this. The user's consent may represent that a contract is made between the user and the VDI service provider. Also, the computer apparatus 200 may collect data based on the contract made between the user and the VDI service provider. Records of the collected data may be stored by the VDI service provider as a separate snapshot. For example, providing of the user interface for the consent and collecting of the data may be performed by the user manager 331 of FIG. 3.

In operation 1060, the computer apparatus 200 may transfer the collected data. For example, the computer apparatus 200 may transfer the user data to the VDI service provider through a secure channel, for example, an access API form. Upon termination of the VDI service, the computer apparatus 200 may store a use record of the user. Depending on example embodiments, the computer apparatus 200 may store the use record of the user in the personal data vault 360 and may store a record related to transferring the collected data in a blockchain or a nonmodifiable ledger through the blockchain based data controller 370. For example, transfer of the collected data may be performed by the user manager 331 of FIG. 3. Depending on example embodiments, as described above with reference to FIGS. 7 to 9, the computer apparatus 200 may transfer the collected data to the VDI service provider or the external module of the external provider through a computer program (e.g., the data collector 710, the ad agent 720, or the federated learning agent 910) provided from the VDI service provider or the external provider and installed on the computer apparatus 200.

The collection range of data may include an access date and time of a user device (e.g., the user device 320 of FIG. 3), an access area of the user device, basic VDI information, and additional VDI information.

The access area of the user device may use global positioning system (GPS) information in the case of a mobile device and may use Internet protocol (IP) information in the case of a wired device. Also, the basic VDI information may include the user's use environment, use time, use IP address, and VDI image type. Also, the additional VDI information may include a VDI service provision range, a VDI service use record (e.g., a print, a third party access and attach), and an application (e.g., a browser) use record within VDI.

The VDI service provider 330 that receives the VDI service request from the user may reduce burden of cost used to supply the VDI service through a real-time bidding for VDI service support companies (e.g., advertising providers or data collection companies) that desire to obtain information of a corresponding user when supplying the VDI service in response to the corresponding VDI service request.

To this end, the VDI service provider 330 may define a characteristic of the user by analyzing user use information and may link with a VDI service support company that requests collection of related user data based on the defined characteristic of the user when the corresponding user uses the VDI service.

As described above, according to some example embodiments, online service providers and/or adverting providers may provide a VDI-based computing service to users and may collect user information generated through the provided VDI-based computing service. For example, users may use a VDI-based computing service provided from a service provider under the condition of providing user information to a service provider that provides the VDI-based computing service or advertising providers contracted with the service provider. The service provider may collect personal information on the VDI and may provide an advertising service or a personalized service to the users based on the collected personal information.

The systems and/or apparatuses described herein may be implemented using hardware components, software components, and/or a combination thereof. For example, a processing device and components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable media including program instructions to implement various operations embodied by a computer. Here, the media may be to continuously store a computer-executable program or to temporarily store the same for execution or download. Also, the media may include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of other media may include recording media and storage media managed by an app store that distributes applications or a site, a server, and the like that supplies and distributes other various types of software. Examples of program instructions include both machine code, such as produced by a compiler, and files containing higher level code that may be executed by the computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A user information collection system implemented by at least one computer apparatus, the user information collection system comprising at least one processor,
wherein the at least one processor is configured to:
manage provisioning of a virtual desktop infrastructure (VDI) service provided from a VDI service provider, the VDI service including a virtual desktop, a virtualization service of a desktop, or a service that generates a virtual machine;

manage charging information according to a use of the VDI service by a user;

manage a policy for the VDI service;

manage information of the user using the VDI service;

manage a lifecycle of the VDI service provided from the VDI service provider, the lifecycle being set for the VDI service, and the at least one processor determining whether the lifecycle for the VDI service is elapsed; and manage connection infrastructure information between a cloud environment for providing the VDI service and the VDI service provider and/or between external software as a service (SaaS) for providing the VDI service and the VDI service provider, wherein the cloud environment is selected by a provider of the user information collection system and/or the VDI service provider, wherein at least one service of the external software as a service is provided to the user in response to a contract with the VDI service provider or a request from the user, wherein a computer program including a federated learning agent provided from the VDI service provider is installed and executed on the user information collection system, and data associated with the user collected by the computer program including the federated learning agent is provided to an external module of the VDI service provider, in exchange for providing the user with the VDI service, wherein a record related to transferring the collected data is stored in a blockchain or a non-modifiable ledger.

2. The user information collection system of claim 1, wherein the at least one processor is configured to provide a user interface for receiving a consent on transferring the data collected according to the use of the VDI service by the user to the VDI service provider.

3. The user information collection system of claim 1, wherein the at least one processor is further configured to:
monitor the VDI service and to determine whether service level agreement (SLA) requirements of an individual user level are met.

4. The user information collection system of claim 3, wherein the at least one processor is configured to evaluate a provision state of the VDI service according to the VDI service provider.

5. The user information collection system of claim 1, wherein the VDI service provider comprises a physical computer apparatus of a provider that desires to collect the data through providing of the VDI service.

6. A user information collection method executed by a computer apparatus including a user information collection system comprising at least one processor, wherein the at least one processor is configured to:

manage provisioning of a virtual desktop infrastructure (VDI) service provided from a VDI service provider, the VDI service including a virtual desktop, a virtualization service of a desktop, or a service that generates a virtual machine;

manage charging information according to a use of the VDI service by a user;

manage a policy for the VDI service;

manage information of the user using the VDI service;

manage a lifecycle of the VDI service provided from the VDI service provider, the lifecycle being set for the VDI service, and whether the lifecycle for the VDI service is elapsed being determined, the lifecycle being set for the VDI service, and the at least one processor determining whether the lifecycle for the VDI service is elapsed; and manage connection infrastructure information between a cloud environment for providing the VDI service and the VDI service provider and/or between external software as a service (SaaS) for providing the VDI service and the VDI service provider, wherein the cloud environment is selected by a provider of the user information collection system and/or the VDI service provider, and wherein at least one service of the external software as a service is provided to the user in response to a contract with the VDI service provider or a request from the user, wherein a computer program including a federated learning agent provided from the VDI service provider is installed and executed on the user information collection system, and data associated with the user collected by the computer program including the federated learning agent is provided to an external module of the VDI service provider, in exchange for providing the user with the VDI service, wherein a record related to transferring the collected data is stored in a blockchain or a non-modifiable ledger.

7. A non-transitory computer-readable record medium storing instructions that, when executed by a processor, cause the processor to perform the user information collection method of claim 6.

* * * * *